Jan. 16, 1940.  G. W. WHITTINGTON  2,187,216
BALE TIE MACHINE
Filed July 23, 1938  5 Sheets-Sheet 5
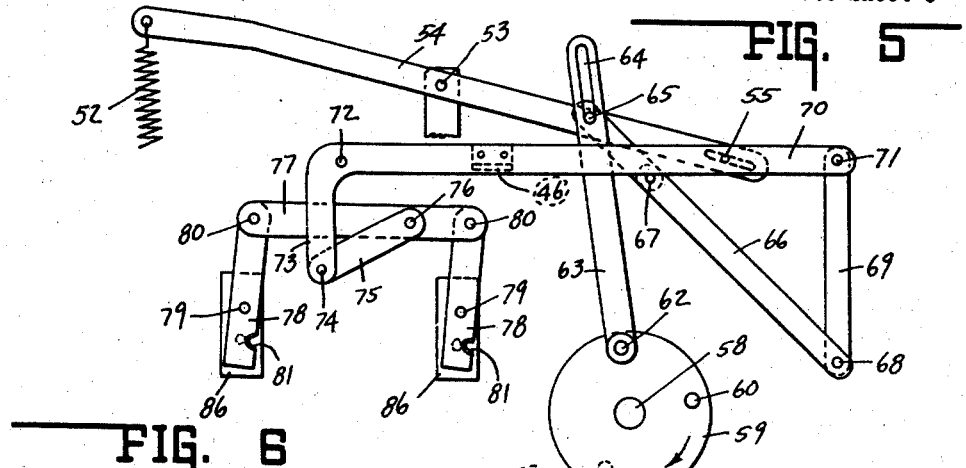
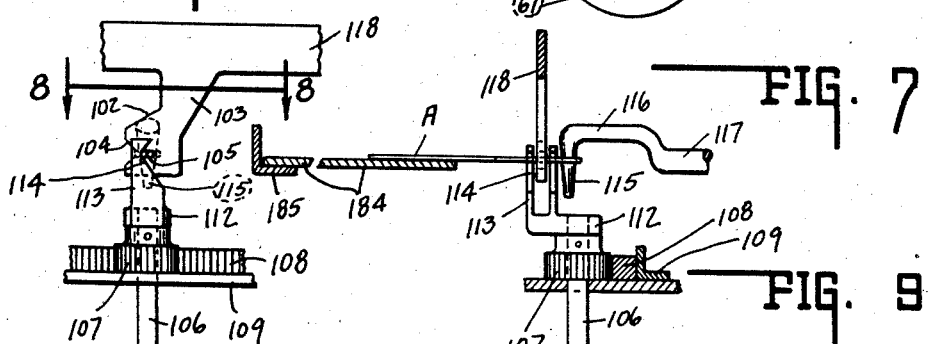
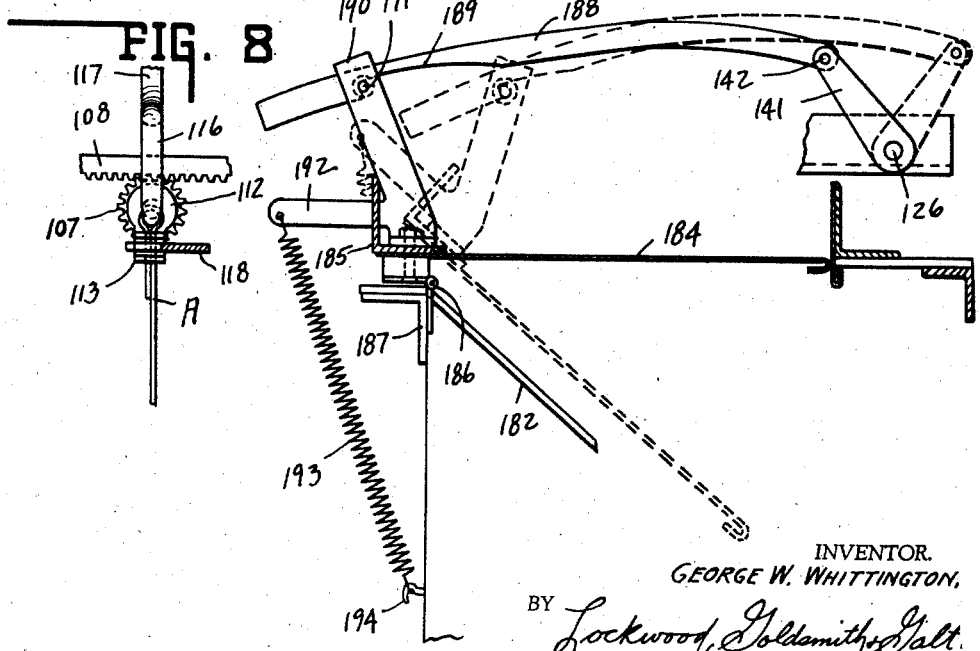
INVENTOR.
GEORGE W. WHITTINGTON,
BY Lockwood, Goldsmith & Galt
ATTORNEYS.

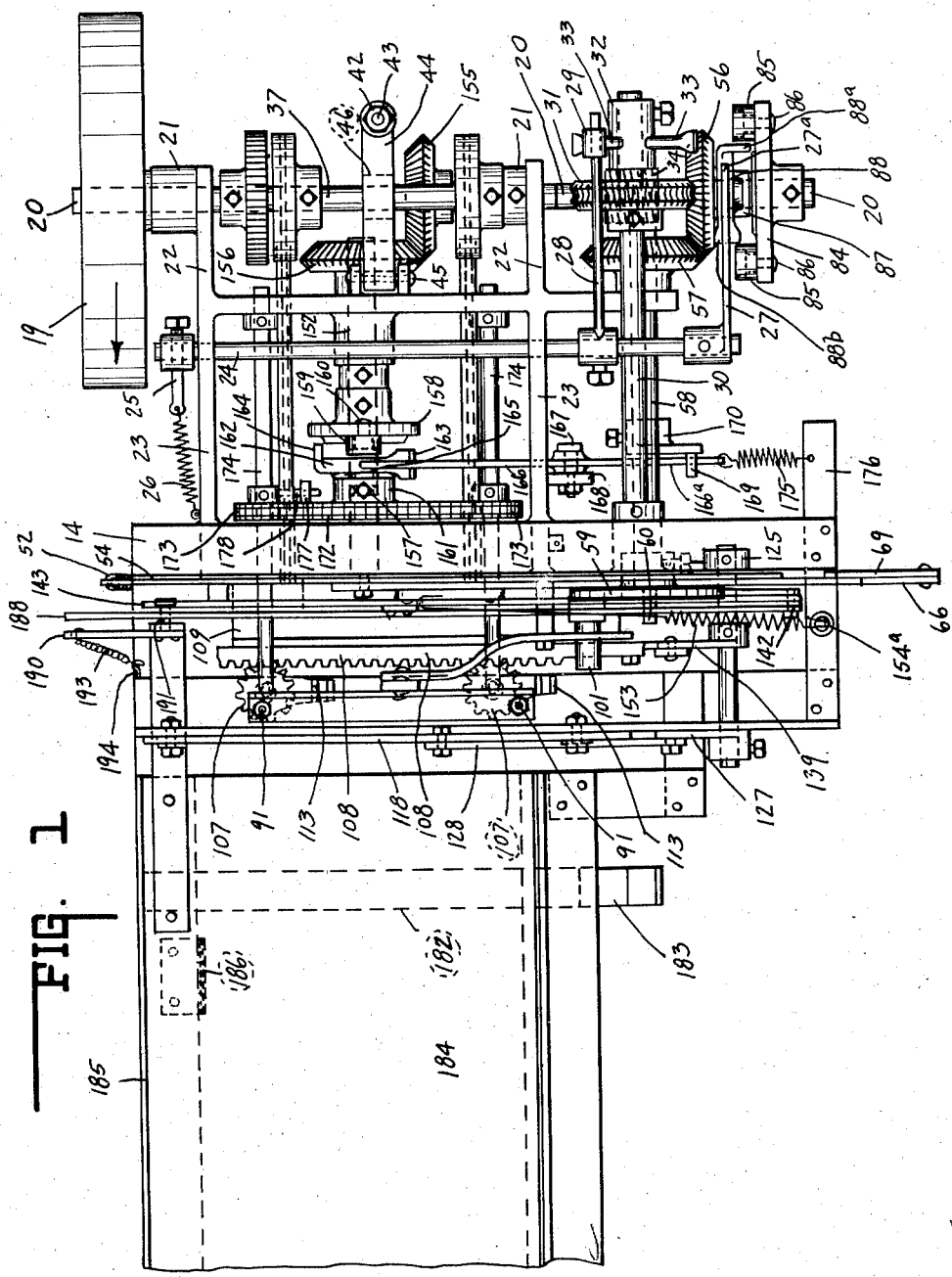

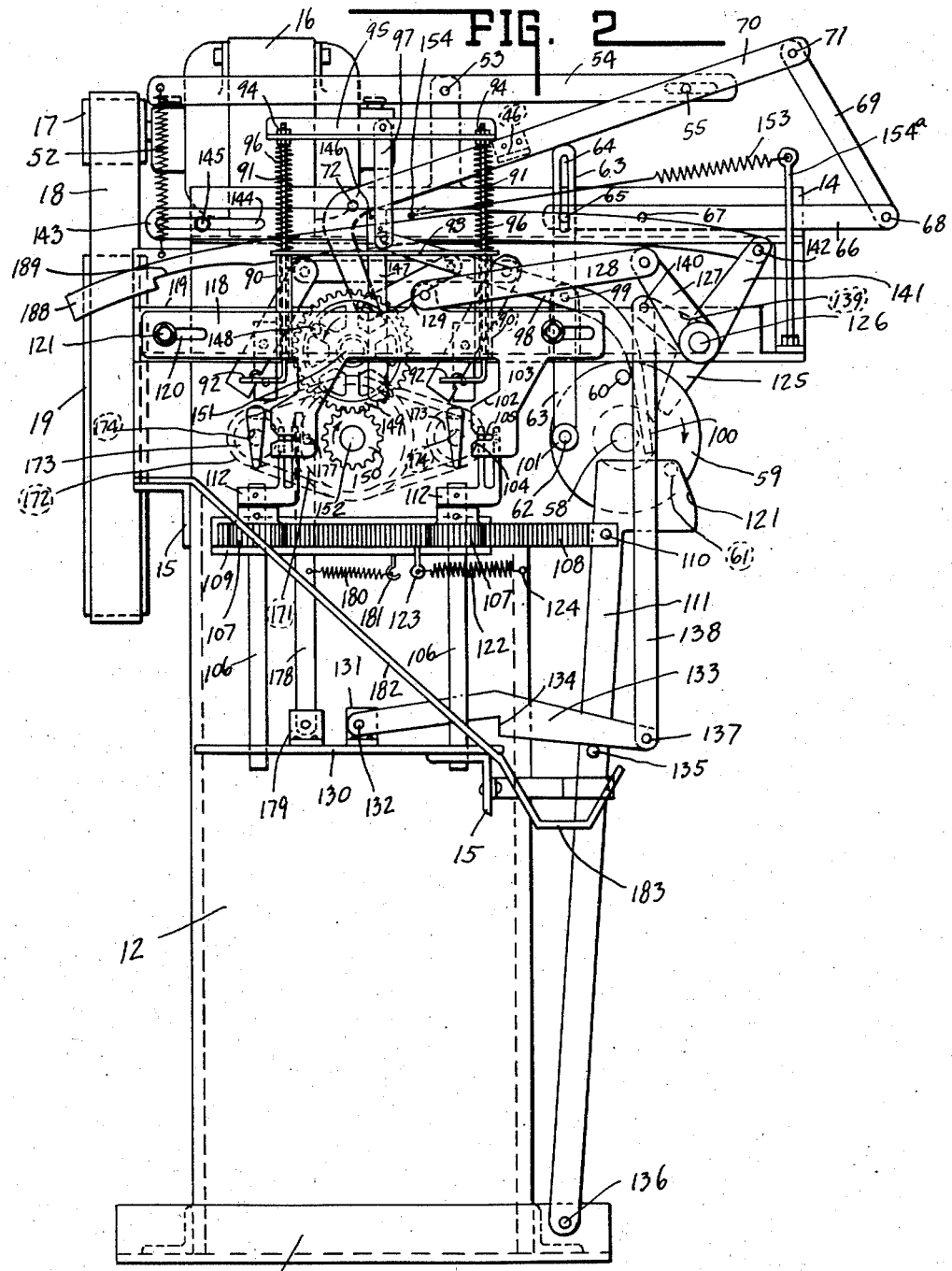

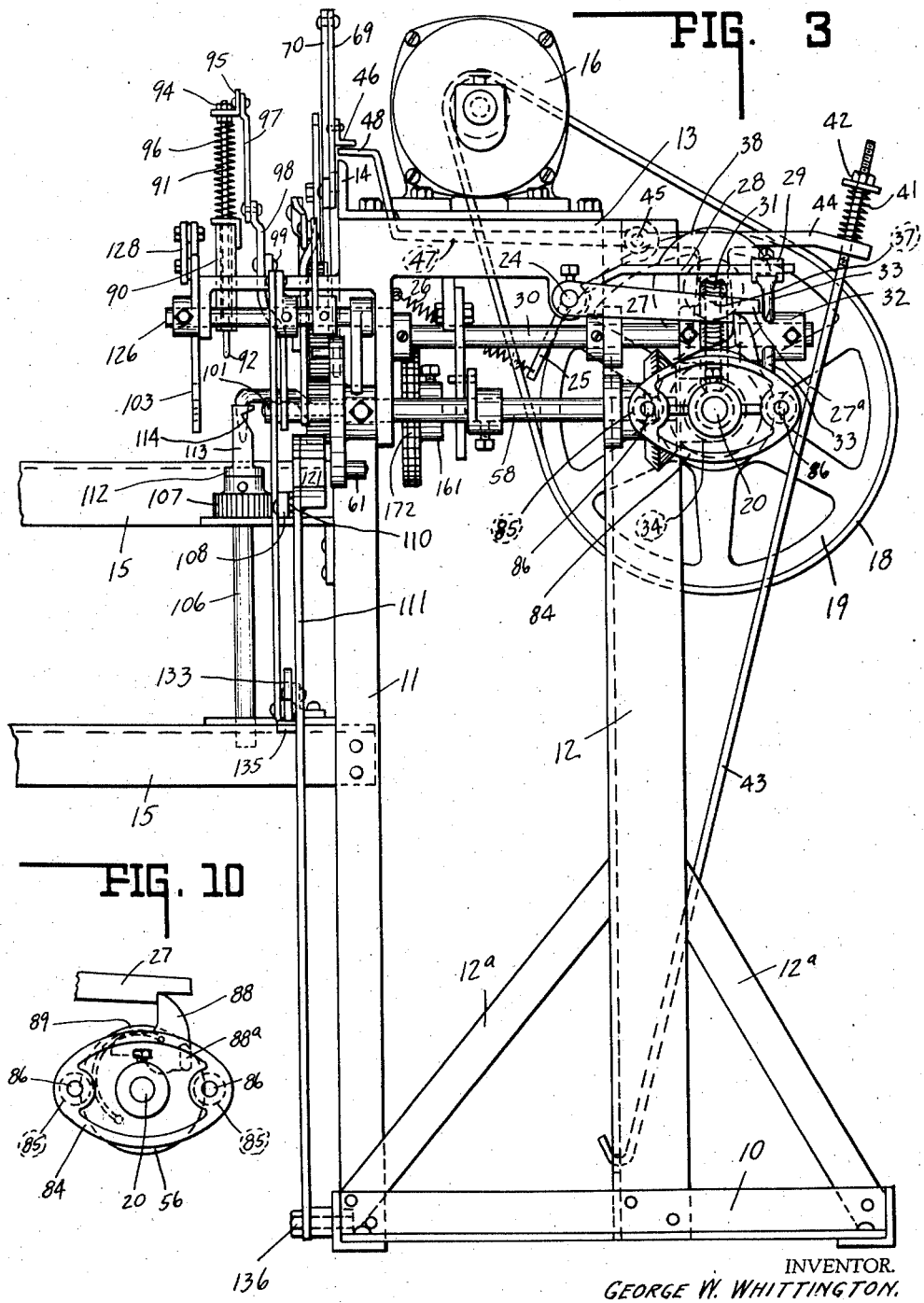

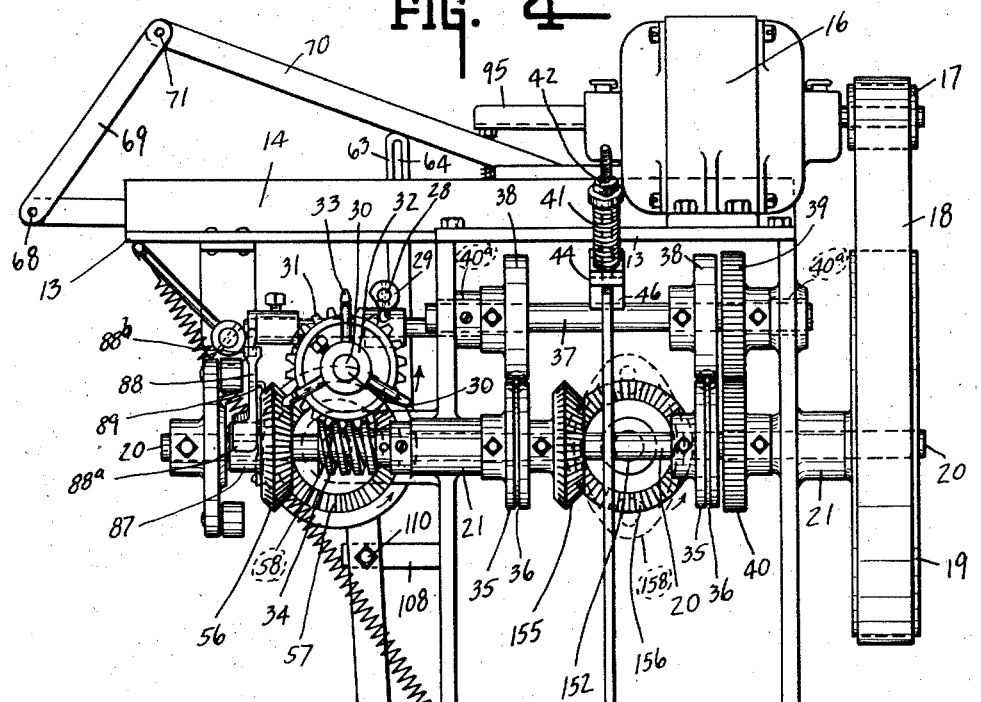

Patented Jan. 16, 1940

2,187,216

UNITED STATES PATENT OFFICE 2,187,216

BALE TIE MACHINE

George W. Whittington, Indianapolis, Ind., assignor of one-half to Charles C. Bolte Application July 23, 1938, Serial No. 220,866

7 Claims. (Cl. 140—73)

This invention relates to a wire tying machine.

The chief object of this invention is to fabricate twisted loop ends on wires which are adapted for use in the tying of material arranged in bale formation, such as hay, straw, and the like, although the invention is not restricted solely to bale wire loop formation.

Another object of the invention is to continuously fabricate bale wires of this general character from a suitable wire supply, usually in reel form, so that each bale wire when formed has a looped end of twisted anchor character and is of the desired length.

Another object of this invention is to provide mechanism which is capable of multiplication and have the same simultaneously operable from a common source of power for simultaneously forming a plurality of like bale wires having twisted loop ends.

Another object of the invention is to provide a machine which is capable of utilizing any gauge of wire within reason so that bale wires may be fabricated of several different gauges of wire without any adjustment whatsoever of the device, so that the bale wires thus formed are of substantially the same character, only having greater tensile strength for particular purpose for which they are intended to be used, dependent upon the gauge and type of material comprising the wire stock.

The chief feature of the invention consists in the formation of a machine capable of accomplishing one or more of the foregoing objects and which machine is relatively simple in character and requires little or no adjustment and the cooperating parts of which are of permanent character, requiring little or no replacement during the life of the machine.

Other objects and features of the invention will be set forth more fully hereinafter.

The full nature of the invention will be understood from the accompanying drawings and the following description and claims:

In the drawings,

Fig. 1 is a top plan view of more especially the power portion of the machine embodying the invention, the twisted anchor loop forming mechanism being also shown in plan view.

Fig. 2 is a front elevational view of the machine with parts omitted and looking at the bale tie discharge end thereof.

Fig. 3 is a side elevational view of the machine and is taken looking toward the right hand end of the same, as shown in Fig. 2.

Fig. 4 is a rear elevational view of the machine and is taken from the opposite direction that Fig. 2 is taken.

Fig. 5 is a front elevational view of a portion of the mechanism shown most clearly in Fig. 2 and which consists of the cutting knives which cut the bale wire to length prior to formation of the twisted anchor loop therein and shows the parts in the wire severing position.

Fig. 6 is a front elevational view of the twisted loop forming mechanism.

Fig. 7 is a similar view thereof taken at right angles.

Fig. 8 is a sectional view taken on line 8—8 of Fig. 6 and in the direction of the arrows, Figs. 6, 7 and 8 illustrating said parts in the initial loop forming position previous to the formation of the twist for permanent formation of the loop.

Fig. 9 is a front elevational view, with parts in section of the tilting platform and the actuating mechanism therefor, full lines indicating the wire segment supporting position and dotted lines indicating the releasing portion.

Fig. 10 is an elevational view of the combination, latch, lock dog and clutch positioned on the end of the main power shaft opposite the pulley.

Fig. 11 is an elevational view of one of the bale ties made by the machine, the subject matter of this invention.

To provide a preliminary foundation for a correct understanding of the operation of the machine and interrelationship of the respective parts hereinafter to be described, said operation may be briefly summarized as follows:

The wire is mounted on a rotatable reel. The wire stock usually is in reel or roll form. The free end of the wire is passed between friction feed rolls which are initially caused to feed a predetermined amount of wire through the machine and upon that predetermined amount being fed through the machine, the feed rolls are operatively disassociated from the wire and inasmuch as the wire supply is taken from the supply reel by means of the pulling force of the friction rolls, additional wire supply at that time is not effected. Following stoppage of such feeding, the cutting mechanism automatically severs the wire, the length of which has been predetermined, as previously set forth. Previous to this severance, the extended length of wire has been gripped by other mechanism and held stationary. Following severance of the predetermined length from the main wire supply, the loop forming mechanism becomes operative in association with the holding mechanism and the end portion of the predetermined length of wire adjacent the severance, is moved into loop formation and is held therein.

Thereafter other mechanism becomes operative to twist the portion of the wire adjacent the loop and the immediate free end of the wire adjacent the looped end and together so as to form an anchorage with the result that a permanent loop is formed in the severed end of the wire. Upon completion of this twisting operation, all the parts are disengaged from the forming mechanisms and the wire is discharged to any suitable collection device. If desired, the wire may be discharged onto a tiltable table which at the time of release from the twisting mechanism, automatically is tilted to discharge to the receptacle or collection device for the completely formed bale wires. At this time it is to be further observed that the constraint imposed upon the feeding rolls to insure feeding is removed only during the cutting period so that at the time of cut, the wire is stationary but thereafter the constraint is automatically imposed on said wheels so that the wires continue to feed a subsequent length of wire into the machine while the loop is being formed and the anchorage is being formed so that immediately upon discharge of the bale wire following its formation, the device is conditioned to begin the immediate fabrication of a second bale wire. This assures an overlapping of the time cycle so that the capacity of the machine is not determined by the summation of time of all of the operations hereinbefore noted but is materially less than that.

This overlapping, as it were, is both in the matter of time and in the embodiment of the invention is in the matter of positioning. The incoming subsequent wire length is positioned in superposed relation while the other loop forming operations are being performed on the other lower level wire length.

With this brief explanation or outline of the general operation of the machine, reference will now be had to the several figures of the drawings.

In Figs. 2 to 4, inclusive, 10 indicates a base structure from which there extends upwardly suitable uprights 11 in the form of angles or the like, and a parallel channel 12. The channel 12 may be braced as at 12a.

A platform structure is indicated by the numeral 13 and is carried by the upper ends of said members 11 and 12. Suitably secured to the platform structure is an angle iron extension 14. Also carried by the angle irons 11 are the outwardly extending angle irons 15, one being secured to one angle iron 11 and the other being suitably secured to the other angle iron 11, and one being positioned above the other, as shown in Fig. 3.

Suitably supported on the platform is a motor 16, the shaft of which mounts a driving pulley 17 adapted to drive a belt 18 carried by a power pulley 19. The power pulley is mounted on the shaft 20 in turn rotatably supported in outboard bearings 21 basically carried by the upright channel member 12 constituting the main portion of the frame of the machine, these outboard bearing support portions being indicated by the numeral 22 in Fig. 1.

Also extending forwardly or oppositely from said portions 22 are the portions 23 which carry the angle iron 14 that extends parallel to the shaft 20.

Suitably supported parallel to the shaft 20 is a rock shaft 24 mounting at one end an arm 25 which is constrained by means of a spring 26 into predetermined position. The opposite end of said shaft mounts an arm 27 and the same has an end 27a that constitutes a stop. The shaft 24 also carries an arm 28 having an adjustable cam portion 29 mounted near the outer end thereof.

A shaft 30 transverse to shafts 20 and 24 is suitably supported in appropriate bearings and carries a worm wheel 31, to which reference will be had hereinafter, and by which the shaft 30 is rotated. The shaft 30 adjustably mounts a cam supporting member 32, herein shown provided with three cam portions 33 adapted to successively engage the portion 29 to successively elevate the arm 28 and cause it to rock the shaft 24 in opposition to the constraint imposed by spring 26 and thus elevate the stop member 27 and more especially elevate the end 27a out of stopping position to permit other mechanism to thereafter function and which mechanism will be hereinafter described more fully.

The shaft 20 mounts a worm 34 that meshes with the worm wheel 31 so that with the mechanism previously described, for each revolution of the pulley 19, the stop member will effect a release of the mechanism three times per revolution, first mentioned.

Also mounted on the shaft 20 is a plurality of wire feeding and guiding wheels. These wheels of which only two are illustrated, are indicated by the numeral 35 and the periphery thereof is provided with a wire receiving groove 36. A shaft 37 is positioned above the shaft 20 and is mounted in suitable bearings so that said shaft 37 can be moved toward and away from shaft 20, as will hereinafter be pointed out.

Shaft 37 mounts a wheel 38 having in this instance, a relatively smooth periphery, the smooth peripheral portion thereof engaging the smooth peripheral portion of the wheel 35, unless the diameter of the wire is such that the wire seated in groove 36 projects beyond the periphery of the wheel 35. This usually is the case. In other words, the wire is frictionally gripped between the two wheels.

There is also secured to the shaft 37 a gear 39 that meshes with a gear 40 also carried by the shaft 20 so that the shaft 37 is rotated at the same rate as the shaft 20, because the two gears are always in mesh and the two gears are substantially identical. Therefore, since the two wheels 35 and 38 are of substantially the same diameter, they rotate at the same rate and, therefore, the feeding of the wire is by reason of such rotation and through the friction imposed on the wheel 38.

The simplest form of bearing structure is in the form of elongated slots, indicated by the numeral 40a and thus gravity, assisted by a spring 41, the tension of which is adjusted as at 42 and carried by rod 43, causes the shaft 37 to be lowered so that the two wheels are in engagement and the two gears, last mentioned, are in mesh. The spring bears upon a member 44 which is pivotally supported as at 45 and has a portion 46 riding on the shaft 37.

Positive means for relieving the pressure on the spring 41 is provided and this is operable during the operation of the cutting knives, to-wit, for severing the wire. The purpose of the aforesaid is to insure the retention of the wire between the two cooperating feeding wheels and to permit the feeding wheels to rotate during the cutoff movement of the cutting knives but without the feeding of the wire at that time. In this way, the wire cannot escape during the cutting off movement and immediately following the same, the opposing constraint opposed to the spring 41 is removed, permitting the spring to become operative for insuring the positive frictional feeding of the wire by reason of the two cooperating wheels. It is to be understood that the gears 39 and 40 always remain in mesh.

The lever 44 is extended rearwardly as at 47 and the free end 48 thereof lies beneath the actuating cam 46, previously described. When the knife cutting mechanism is initially actuated to insure wire severance, the cam 46 depresses the lever 47 which elevates the extension portion 44 and imposes an opposing constraint upon the spring and thus takes the friction load off the upper wire feeding wheels, permitting said wire feeding wheels to rotate without wire feeding, although still retaining the wire in operative position between the wheels during the severing operation.

Reference will now be had to Figs. 1, 2, 4 and 5. In Fig. 4 the shaft 20 is shown provided with a bevel pinion 56 which meshes with a bevel gear 57 mounted on the shaft 58 parallel to the shaft 30 and extending forwardly from the shaft 20, the axis of both intersecting.

The other end of the shaft 58 carries a wheel 59 which mounts a pair of pins 60 and 61 on opposite sides—see Fig. 2—and carries an eccentric pin 62 that is connected to one end of a connecting rod 63, the latter having an elongated slot 64 therein, in which rides a pin 65 carried by a lever member 66 fulcrumed as at 67. The opposite end of the member 66 is pivotally connected as at 68 to the link 69, the other end of said link being pivotally connected to a lever 70 as at 71, said lever being fulcrumed as at 72 and having an actuating arm portion 73 connected as at 74 to a link 75, in turn connected as at 76 to a link 77. The link 77 at opposite ends is connected to the pivotally mounted cutting knives 78.

These knives are pivotally supported as at 79 and pivotally connected to link 77 at 80—see Fig. 5. The knife includes an arcuate shaped cutting portion 81. Lever 70 carries the cam member 46, previously described, so that each time as the movable cutting knives are actuated, the constraint imposed on the driving wheels will be removed.

Associated with each cutting knife is a stationary knife 86. The lever member 70 as at 55 pivotally supports a lever member 54 fulcrumed at 53 on the frame, and the free end of the same is connected to one end of a spring 52, the other end of which is anchored to the frame. This mechanism is provided to return the knife actuating operating mechanism to non-cutting position.

There is interposed between the shaft 20 and the bevel gear 56, a suitable clutch construction to which reference will now be had, and this is shown most clearly in Figs. 1, 3 and 4.

The projecting end of the shaft 20 carries an elliptical plate 84, in turn provided with diametrically positioned rollers 85 carried by the pins 86. The bevel gear 56 includes a hub portion 87 and this is enlarged laterally and parallel to the body portion of the gear and therebetween is pivotally supported a dog 88 constrained by spring 89 into predetermined position. This dog has a cam face 88a which when the dog is released to its constraint, is tilted into operative position so as to be engaged by one of the rollers 85 that is next presented to it.

The opposite end of the dog has a tail portion 88b which normally is positioned, due to its constraint imposed by the spring 89 so that the dog is retracted so far as this driving cam face is concerned and the stop portion is projected. This stop portion, in the rotation of the gear 56, engages the stop face 27a of the arm 27 and continued rotation causes the driving wheel or roller to disengage from the driving face 88a of the dog, and thus the elliptical shaft plate 84 can continue to rotate with shaft 20 without any further rotation of the gear 56. During the time, however, that the dog has its cam face operatively engaged with one of the rollers 85, the gear 56 will rotate with shaft 20 and will cause the shaft 58 to also rotate therewith and at the same rate, since the two gears 56 and 57 are substantially identical and at the time this driving is effected, the shaft 20 is directly coupled to the gear 56. The gear 56, however, is only capable of one revolution before the dog 88 by reason of its spring 89, is caused to have this stop portion 88b engage the stop face 27a of the arm 27, as previously described.

While the wire segments thus severed normally drop by gravity to the loop and twist forming mechanism, there is in this invention included a positive means for insuring lowering of this severed wire and delivery of the same to said mechanisms hereinafter to be described, and in predetermined position. In other words, not only is the wire positively lowered but it is guided to said mechanism following severance from the main stock.

Extending upwardly—see Fig. 2—is a pair of spaced tubular guides 90 in each of which there is slidably mounted a rod 91 having an angular end 92. The two rods project upwardly beyond said guides 90 and extend through the strap 93. Adjustably supported on the ends of the rods, as at 94, is a cross member 95. Interposed between the two cross members 93 and 95, are suitable means normally tending to elevate the rod 91, and, therefore, the lateral portions 92 thereof. The elevated position is illustrated in Fig. 2. This constraining spring means is shown as two springs 96, each concentric with one of the rods 91.

A link 97 is connected at one end of the member 95 and its opposite end is connected to a lever 98 fulcrumed as at 99 on the frame of the machine. The lever 98 has a tail portion 100 and this tail portion hangs downwardly and is adapted to be engaged by roller 101 carried by the eccentric pin 62, previously described as mounting the arm or link 63. Upon engagement of the roller 101 with the tail portion 100 of the cam type lever 98, the member 95 is lowered in opposition to springs 96 and this causes the lateral portions 92 to also lower. This lowering movement takes place immediately following the cutting of the wires.

It will be observed that the knives 78 show the wire cutting portions 81 slightly above the angular portions 92 of this depresser arrangement, but it will also be noted—see Fig. 5—that when these knives are tilted counterclockwise, the knife cutting portions 81 will lie below the uppermost position of the lateral portions 92 so that immediately upon severance, the severed wire portions, which are thereneath, are caused to be forced downwardly and positively, if gravity does not effect the same, by the angular portions 92 becoming operative, as stated, immediately following wire severance.

The severed portions of the wire are caused to ride downwardly on the inclined beveled face 102 of the member 103. This member 103 near its lower end has a V-shaped mouth 104 leading into a lateral slot 105. This is a wire receiving slot and receives the severed wire portion, as will be hereinafter pointed out, and by mechanism to be described. This mechanism also is clearly illustrated in Figs. 6 to 8, inclusive.

A pair of vertically mounted shafts 106 at their upper ends mount gears 107 that mesh with the rack 108 suitably guided by the frame portion 109. The rack at one end as at 110 is pivoted to a lever 111. The vertical upward extension of each shaft 106 mounts the collar portion 112 which in offset relation carries a pair of spaced parallel upwardly extending folding portions 113. These folding portions are provided in one face with a V-shaped groove 114. At the proper interval, following severance and depression of the severed wire into position, the rack is actuated to cause the pinion to rotate, which in turn causes the parallel, V-shaped members to rotate. In doing so, these V-shaped members engage the wire segment immediately adjacent the severed end and cause it to assume a loop form because the severed end of the wire is caused to move around a depending conical portion 115. This depending conical portion is carried by an offset portion 116 on the shaft 117 to which reference will be had hereinafter.

The member 103 when in loop holding position nests between the two parallel wire holding portions 113. This is shown clearly in Figs. 6, 7 and 8, which shows the wire previous to the twisting operation. To insure positive clamping of the wire, the member 103 is caused to move to the left—see Fig. 6—and as hereinafter pointed out.

Suffice to say, this shaft 117 following loop formation, is caused to rotate and this forms the twist type anchorage. It is also to be noted the wire support and guiding structure 103 is carried by a cross member 118 which is slidably supported in a guide structure 119 carried by the machine. This member 118 includes a plurality of elongated slots 120 and guide pins 121 carried by the machine ride therein. The member 118 is caused to reciprocate at a predetermined time for wire clamping.

As previously set forth—see Fig. 2—the wheel 59 mounts a cam pin 60. This is adapted to engage the cam face 121 of the lever member 111. Such engagement causes lever 111 to tilt counter-clockwise, moving the rack 108 to the left. Upon pin release, the spring 122 secured as at 123 to the rack and as at 124 to the frame, returns the lever and the rack to the full line position, shown in Fig. 2, which is the normal stationary position.

The pin 61 also carried by the plate 59 is adapted to engage one arm 125 of lever pivoted as at 126 on the frame. This lever has an arm 127 which is connected by link 128 to an ear 129 carried by the sliding member 118, which carries the wire guiding and holding members 103, and secures wire clamping. The loop is formed as previously stated.

This structure is locked in this position by the following means shown most clearly in Figs. 2, 3 and 4. In these figures, a plate 130, which also serves as a bearing for the lower end of the shaft 106, supports a bracket 131 which pivotally supports at 132 a locking member 133 having the latch portion 134 that cooperates with a pin constituting a catch 135 mounted on the lever 111 pivoted as at 136 on the base structure 10. The end of the arm as at 137 is connected by link 138 to an arm 139 at 140 and said arm is rigid with the shaft 126 and actuated in timed relation therewith.

During the entire twisting operation, the loop forming portion of the wire, as shown clearly in Fig. 8, is tightly clamped and is so held in that position until the twisting operation is completed. This clamping force is insufficient to prevent the two parallel portions of the wire section, designated by A in Fig. 8, from slipping in the holder arrangement to provide the appropriate amount of stock necessary for forming the twist. This frictional holding, however, is important because it insures a close, positive locking twist. If these two parallel portions were not so constrained, this twisting operation would be characterized by the formation of a very sloppy and loose anchor type twist. Means for releasing this locking arrangement is shown most clearly in Fig. 2.

Secured to the shaft 126 is an arm 141 which is pivotally connected as at 142 to an arm 143 having an elongated slot 144. Mounted in said slot is a pin 145 carried by a portion of the frame and serving as a guide for said arm.

Suitably secured to said arm as at 146—see Fig. 2—is a depending member 147 which is adapted to be engaged by a pin 148 carried by a gear 149 meshing with the pinion 150. The gear 149 is carried by shaft 151 and the pinion is carried by the shaft 152. Reference will be had to the power supply later. When this pin engages the depending member 147 it moves the bar member 143 to the right and thus rocks the shaft 126 in a direction opposite to that in which it has been previously rocked by reason of pin 61 engaging the arm 125. This reverse rotation of shaft 126 elevates the link 138, and, therefore, elevates the latch member 133 to release the latch from the pin 135 carried by lever 111. A spring 153 is anchored as at 154 to the member 143 at one end and is stationarily anchored at its opposite end to an extension 154a. It will also be remembered the spring 122 not only returns the rack to the position shown in Fig. 2 but also, by reason of the connection thereof to the lever 111, returns said lever 111 to its normal and initial position.

The mechanism for forming the twist will now be described. Referring first to Figs. 1 and 4, it will be noted the shaft 20 carries a bevel gear 155 which is in constant mesh with a similar gear 156 carried by the shaft 152 transverse to shaft 20, the axes intersecting, said shaft 152 being parallel to the shafts 30 and 58, before mentioned.

A clutch and lock structure substantially similar to that previously described as being positioned adjacent the projecting end of the shaft 20 is carried by the shaft 152 and is similarly operable. This clutch structure includes the elliptical member 158 mounting the diametrical pair of rollers 159 on the pins 160. The shaft 152 rotatably supports a gear hub 161 which is confined against axial movement of the shaft 152 by means of a locating pin 157 riding a groove on said shaft.

Carried by the hub portion 161 is the dog 162 having the stop portion 163 and the cam portion 164. A spring 165 constrains this pivotally mounted dog into operative position so that the catch portion in the rotation incident to the engagement of the roller 159 with the cam portion 164, will engage the end or stop portion 165 of the member 166—see Fig. 1—pivotally supported at 167 upon the frame bracket member 168. This member 166 has an extension 166a adapted to be engaged by the cam pin 169 carried by the rotating member 170 secured to the shaft 58. At the appropriate time, the cam portion 169 engages the end 166a of the member 166 and tilts this lever structure upwardly so as to disengage or remove the constraint imposed on the tail portion 163 of the dog structure. The spring 165 thereupon becomes effective and moves the cam portion of this locking dog into position so that it can be engaged by the next presented roller 159. It will be noted that this elliptical clutch member rotates continuously and at the same rate as shaft 20 so that at the appropriate time the gear 157 previously mentioned, and the sprocket 171 rotate at the same rate as shaft 20.

The sprocket 171 drives a chain 172 which drives two sprocket pinions 173 rotatably supported in the frame work. Each of these sprocket pinions is carried by a shaft 174 and mounts on the projecting end the portion 117 terminating in the conical and vertically positioned twisting end 115. As the shaft 174 rotates for each complete rotation, the hook 115 forms a complete twist in the wire adjacent the loop and the number of twists can be regulated. The machine as disclosed herein forms three complete twists.

The stop lever 166 is normally constrained into stopping position by means of the spring 175, said spring being secured to one end of the member 166 and at its opposite end to an extension 176 carried by the frame. The cam pin 169 tilts this lever member 166 in opposition to said constraint at the appropriate time. The sprocket 171—see Figs. 1 and 2—carries a pin 177 adapted to engage in the rotation of the sprocket a tiltable latch member 178 pivotally supported as at 179 on the plate member 130—see Fig. 2. This latch member is normally constrained into latching position by means of the spring 180 anchored as at 181 to the frame.

Following the twisting operation and the cessation of rotation of the twisting hooks, the holding jaws are opened, as previously described, and then the completed, twist anchored loop, wire length is released from the twisting hook and falls downwardly on to the guide 182 and is collected in the trough 183. It has been determined it is unnecessary to provide a stripping mechanism for releasing the loop from the hook twisting member. However, if desired, such additional mechanism may be incorporated, and preferably would be associated with the mechanism now to be described.

So that the length of wire will not be deformed during the twisting operation, because it is solely supported at that time by holding members, a tiltable platform is provided. This tiltable platform, includes a table structure 184 which is merely a strip of sheet metal carried by an angle iron 185 pivotally supported as at 186 on an extension framework 187 which also supports the guide and trough structure 182—183, previously described.

The means for tilting this support structure is as follows:

Referring more especially to Figs. 2 and 9, shaft 126 with arm 141 rigid therewith is operable as described. Pivoted at 142 is another arm 188 having a cam type latch portion 189 therein. Angle iron 185 mounts an upward extension or arm 190 carrying pin 191. This is a tilting arm. It includes a lateral extension 192, the outer end of which is connected to a tension spring 193 fastened as at 194 to a lower portion of the main frame.

When arm 147 is engaged by gear supported pin 148, arm 143 is moved to the right and arm 141 moves clockwise. Also moving therewith is arm 188 which tilts platform 184 for bail wire release to trough 183 in opposition to spring 193.

It will be observed in Figs. 1 and 4 especially that the member 32 is provided with three members 33. The reason for this is that the worm wheel 31 rotates once for thirty revolutions of the worm 34, and, therefore the member 33 will actuate the release to secure rotation of the shaft 58 at the rate of once for every ten revolutions of the pulley wheel 19. This permits the pulley wheel to rotate the wire feeding wheels ten times per cycle, which insures the proper feeding length of wire. When it is desired to change the length of the wire segment or bale tie, the member 32 may be removed and another substituted therefor which would have one or two, four or five members 33 thereon. If the desired length of wire cannot be obtained by making this type of change, the clutch proper, see Fig. 10, on the end of shaft 20 together with the bevel gear 56 may be removed and another worm may be substituted which will mesh with another worm wheel also substituted on the shaft 30 so that the proper length of wire segment may be obtained. This worm and worm wheel change may be utilized with or without the substitution of the part 32—33 so that within operating limits a wide range of selective lengths of bale wires may be obtained.

It will be seen that the length of the wire segment which is to have a twisted loop formed therein is determined by one of two substitutions, or both. Inasmuch as the control for the clutch 158 et seq. is actuated from the cam pin 169 carried by shaft 58 only actuated at predetermined interval following the predetermined amount of wire feeding, it will be noted the before mentioned substitution is the only change necessary to be made for varying the length of the wire segment, when variations in wire lengths are desired.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a wire handling machine, the combination of a pair of wire feeding rolls, wire cutting means, a single source of power for rotating said rolls and operating said means, means interposed between said power and said cutting means for actuating the same cyclicly and intermittently, and means operable in timed relation with the cyclic operation of the wire cutting means for cessation of wire feeding without cessation of feed roll rotation.

2. In a wire handling machine, the combination of wire severing means for forming a wire segment from wire stock presented thereto, wire operating means adjacent thereto, means adjacent the wire severing means adapted to receive the wire segment and guide the same to the operating means, said wire receiving means having an inclined face and a wire receiving groove adjacent the lower end thereof, a rotative wire holder juxtapositioned relative thereto, and a depending pivotal portion coaxial with said rotative wire holder, the rotative wire holder being rotatable about the depending pivotal portion for engaging a wire segment, positioned by the inclined face, adjacent the end of the segment and forming a loop therein in its rotation, and means moving the inclined face receiving means toward the rotative wire holder as the latter approaches its final position for reception of the free end of the segment presented by the rotative wire holder.

3. In a wire handling machine, the combination of wire severing means for forming a wire segment from wire stock presented thereto, wire operating means adjacent thereto, means adjacent the wire severing means adapted to receive the wire segment and guide the same to the operating means, said wire receiving means having an inclined face and wire receiving groove adjacent the lower end thereof, a rotative wire holder juxtapositioned relative thereto, and a depending pivotal portion coaxial with said rotative wire holder, the rotative wire holder being rotatable about the depending pivotal portion for engaging a wire segment, positioned by the inclined face, adjacent the end of the segment and forming a loop therein in its rotation, and means moving the inclined face receiving means toward the rotative wire holder as the latter approaches its final position for reception of the free end of the segment presented by the rotative wire holder, and means rotating the pivotal portion while the cooperating holder and wire receiving recessed means frictionally holds the wire segment adjacent portions together for providing a twist anchorage therein and permanently fixing the loop.

4. In a wire handling machine, the combination of wire severing means for forming a wire segment from wire stock presented thereto, wire operating means adjacent thereto, means adjacent the wire severing means adapted to receive the wire segment and guide the same to the operating means, said wire receiving means having an inclined face and wire receiving groove adjacent the lower end thereof, a rotative wire holder juxtapositioned relative thereto, and a depending pivotal portion coaxial with said rotative wire holder, the rotative wire holder being rotatable about the depending pivotal portion for engaging a wire segment, positioned by the inclined face, adjacent the end of the segment and forming a loop therein in its rotation, and means moving the inclined face receiving means toward the rotative wire holder as the latter approaches its final position for reception of the free end of the segment presented by the rotative wire holder, means rotating the pivotal portion while the cooperating holder and wire receiving recessed means frictionally holds the wire segment adjacent portions together for providing a twist anchorage therein and permanently fixing the loop, and means for stripping the twist anchored loop provided wire segment from the depending pivotal member following anchorage formation and release from the wire holding means.

5. In a wire handling machine, the combination of a source of rotative power, a wire feeding means operable thereby for feeding a wire, said feeding means being of the rotatable type, a wire cutting means intermittently and cyclicly operable by the source of rotative power and adapted to form a wire segment from the wire fed thereto by the wire feeding means, a wire operating means intermittently and cyclicly operable by said source of rotative power, the wire segment formed by the associated cutting means discharging to the wire operating means, the latter being juxtapositioned relative to the cutting and feeding means to permit simultaneous wire feeding of a second wire segment portion during the operation of the wire operating means upon a previously formed wire segment, and means operatively associated with the wire feeding means to insure non-feeding of the wire during wire cutting means operation, the wire feeding means being continuously operable by the source of power.

6. In a wire handling machine, the combination of a source of rotative power, a wire feeding means operable thereby for feeding a wire, said feeding means being of the rotatable type, a wire cutting means intermittently and cyclicly operable by the source of rotative power and adapted to form a wire segment from the wire fed thereto by the wire feeding means, a wire operating means intermittently and cyclicly operable by said source of rotative power, the wire segment formed by the associated cutting means discharging to the wire operating means, the latter being juxtapositioned relative to the cutting and feeding means to permit simultaneous wire feeding of a second wire segment portion during the operation of the wire operating means upon a previously formed wire segment, and means adapted to engage the wire segment following wire segment formation by the cutting means and for conveying the formed segment to the wire operating means.

7. In a wire handling machine, the combination of a source of rotative power, a wire feeding means operable thereby for feeding a wire, said feeding means being of the rotatable type, a wire cutting means intermittently and cyclicly operable by the source of rotative power and adapted to form a wire segment from the wire fed thereto by the wire feeding means, a wire operating means intermittently and cyclicly operable by said source of rotative power, the wire segment formed by the associated cutting means discharging to the wire operating means, the latter being juxtapositioned relative to the cutting and feeding means to permit simultaneous wire feeding of a second wire segment portion during the operation of the wire operating means upon a previously formed wire segment, means operatively associated with the wire feeding means to insure non-feeding of the wire during wire cutting means operation, the wire feeding means being continuously operable by the source of power, and means adapted to engage the wire segment following wire segment formation by the cutting means and for conveying the formed segment to the wire operating means.

GEORGE W. WHITTINGTON.